United States Patent [19]

Miyagawa

[11] Patent Number: 4,729,633
[45] Date of Patent: Mar. 8, 1988

[54] DIELECTRIC MULTILAYER REFLECTOR, AND LASER SYSTEM BASED THEREON

[75] Inventor: Toshio Miyagawa, Tokyo, Japan

[73] Assignee: NEC Corporation, Tokyo, Japan

[21] Appl. No.: 749,096

[22] Filed: Jun. 26, 1985

[30] Foreign Application Priority Data

Jun. 29, 1984 [JP] Japan ............... 59-134301

[51] Int. Cl.$^4$ ............... H01S 3/08; G02B 1/10
[52] U.S. Cl. ........................... 350/166; 372/103
[58] Field of Search .............. 372/99, 103; 350/1.6, 350/1.7, 166, 588, 582

[56] References Cited

U.S. PATENT DOCUMENTS 2,519,722  8/1950  Turner ................. 350/166
4,099,840  7/1978  van der Wal et al. ....... 350/166

OTHER PUBLICATIONS

Crossan, S.C. et al., *IBM Tech. Disc. Bulletin*, vol. 19, No. 6, pp. 1985–1986, Nov. 1976.

*Primary Examiner*—Bruce Y. Arnold
*Attorney, Agent, or Firm*—Schwartz, Jeffery, Schwaab, Mack, Blumenthal & Evans

[57] ABSTRACT

A reflector comprising a laser mirror resists the accumulation of electric charge upon irradiation with a laser beam. The laser mirror comprises a transparent substrate, a plurality of dielectric layers formed over the surface of the substrate, and a conductive layer formed on top of the dielectric layers. The conductive film over the top surface of the dielectric films prevents an accumulation of electric charge. The charge is uniformly distributed by the conductive layer, and the surface potential on the reflector is reduced. As the laser beam irradiated part of the reflector does not remain charged, dust or water vapor in the air is not attracted to the reflector. The conductive layer can be grounded, thereby further preventing the accumulation of electric charge.

21 Claims, 3 Drawing Figures

DIELECTRIC MULTILAYER REFLECTOR, AND LASER SYSTEM BASED THEREON

BACKGROUND OF THE INVENTION

The present invention relates to laser technology, and more particularly to a dielectric multilayer reflector and a laser system using such reflectors.

As resonators for a laser system, fully reflective mirrors, which completely reflect laser beams, and output reflective mirrors, which selectively take out a part of laser beams, are commonly used. These laser mirrors are given their desired reflectivity or transmissivity by coating multiple dielectric layers over a glass or quartz substrate. A dielectric multilayer reflector is usually produced by alternately vapor-depositing films of high and low refractive indices, each layer having a thickness of $\lambda/4$, and the materials to be vapor-deposited, design of the number of layers and vapor-depositing method are well known to those skilled in the art (for instance the U.S. Pat. No. 4,099,840). Since a reflector of this kind, including both its substrate and coated films, consists of insulative materials, its film surfaces have high resistivities both thereupon and in the vertical direction thereof, and therefore are readily electrically chargeable.

If a reflector coated in this manner is used in the path of a laser beam, the part of the reflector irradiated by the beam will be electrically charged in proportion to the duration of irradiation. The charged part will gradually attract dust and vapor present nearby or in the air, and therefore become unable to maintain its prescribed reflectivity or transmissivity. At the same time, the dust and vapor which have adhered to the reflector will absorb the laser beam and eventually destroy the vapor-deposited films. This phenomenon is particularly conspicuous where the reflector is used as a resonator because of the greatness of the laser power within the resonator.

To make up for this disadvantage, it has been necessary, where a laser mirror is used, to isolate either the laser-irradiated part or the whole surface of the mirror from the external air and to keep it dry, as well as to fill the path of the laser beam with dust-free clean air. However, even if this precaution is taken, it is impossible to perfectly shut out dust and water vapor, and therefore the laser mirror has to be cleaned from time to time while in use.

SUMMARY OF THE INVENTION

An object of the present invention, therefore, is to obviate the aforementioned disadvantage and to provide a laser mirror so structured as not to be electrically charged even when irradiated with a laser beam, together with a laser system using such laser mirrors, whose laser power does not weaken with the lapse of time.

According to the invention, there is provided a laser mirror comprising a transparent substrate, dielectric layers formed over the surface of said transparent substrate and a conductive layer formed over the top surface of the dielectric layers, wherein a laser beam is incident on the conductive layer.

A laser system according to the invention uses dielectric multilayer reflectors of the above described composition as laser resonators.

The conductive outermost coated layer does not remain locally charged, and uniformly distributes the electric charge. Further, by grounding the conductive layer, the charge can be caused to leave the reflectors. Accordingly, the surface potentials of the reflectors can be reduced to zero.

BRIEF DESCRIPTION OF THE DRAWINGS

The features and advantages of the present invention will be more apparent from the detailed description hereunder taken in conjunction with the accompanying drawings, wherein.

DESCRIPTION OF THE PREFERRED EMBODIMENTS

Figure 1:
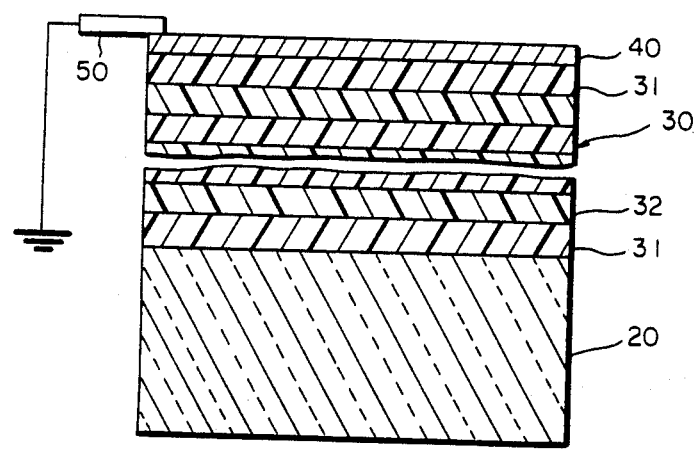
FIG. 1 shows a cross section of a preferred embodiment of the laser mirror according to the invention.

Referring to FIG. 1, a reflector consists of a glass substrate 20, dielectric multilayer films 30 formed over the substrate 20, and a conductive film or layer 40 formed over the uppermost of the dielectric multilayer films 30. The multilayer films consist of 17 dielectric films or layers, which are high refractive index layers 31 and low refractive index layers 32 vapor-deposited one over another. The bottom and top are high refractive index layers. The number of layers is determined according to the desired reflectivity. In this preferred embodiment, the high refractive index layers 31 are made of titanium oxide ($TiO_2$), whose refractive index is 2.25, and the low refractive index layers 32, of silicon oxide ($SiO_2$), whose refractive index is 1.45. The method of their vapor deposition is described, for instance, in the U.S. Pat. No. 4,099,840 referred to earlier.

The conductive layer 40 is formed after the dielectric multilayer films 30 have been formed and their spectrotransmissivity has been measured. To form this layer, first ITO (a mixture of indium oxide [$In_2O_3$] and tin [Sn]), which is to be vapor-deposited, is put in a melting crucible, to whose holder is attached a monitor glass for controlling the film thickness, and the glass substrate over which the dielectric multilayer films are formed is fitted to the holder. Then the substrate is heated to 100° C. with a heater, and the inside of the vapor-depositing apparatus is evacuated to an air pressure of about $1 \times 10^{-5}$ Torr. The ITO which is to be vapor-deposited is evaporated by raising its temperature to about 1000° C. with an electron beam, and the conductive layer 40 is thereby deposited on the top surface of the dielectric multilayer films.

The conductivity of the conductive layer 40 is about 1 $K\Omega/cm^2$, and its thickness is not greater than $\frac{1}{4}$ of the wavelength of the laser beam to be used. This thickness is selected to be thin enough so as not to have adverse effect on reflectivity and transmissivity of the reflector. The laser beam passes the conductive layer 40, and is either reflected or transmitted by the dielectric multilayer films 30. Since this reflector has a conductive film over the top surface of the dielectric films, its irradiated face will never remain locally charged even if it is placed in the laser beam path, but the charge is uniformly distributed by the conductive layer 40, and the surface potential on the reflector is reduced.

As the laser beam-irradiated part of the reflector does not remain charged, it will attract no dust or water vapor in the air. Further, the reflection or transmission by the irradiated part is reduced to eliminate the danger of destruction by the absorption of the laser beam.

If the conductive layer 40 is grounded through a grounding feeler 50, the potential of the conductive coating layer 40 will be always kept at zero, the reflector will never be charged.

Whereas the conductivity of the conductive layer 40 is selected at 1 K$\Omega$/cm$^2$ for this preferred embodiment, this level of conductivity is sufficient to disperse the electrons gathering on the top surface of the dielectric multilayer films 30.

Figure 3:
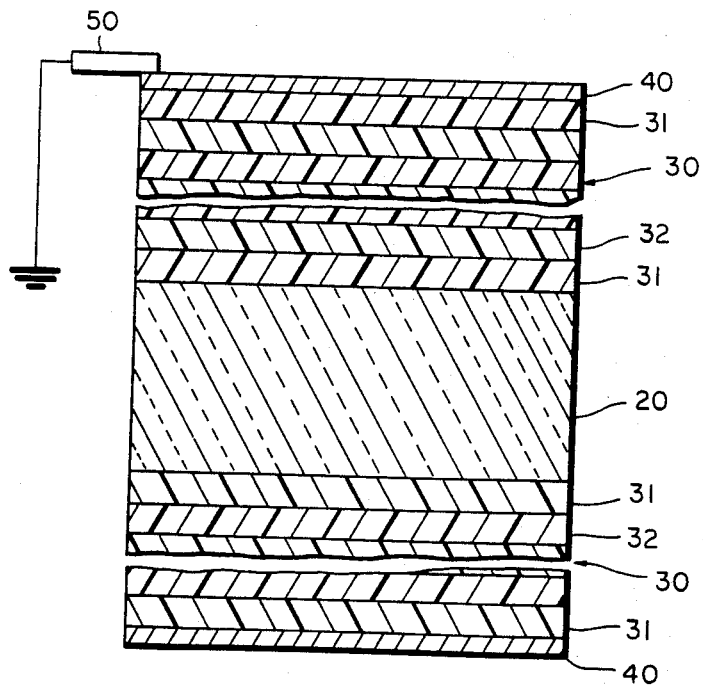
FIG. 3 illustrates a second embodiment of the invention in which both the faces of the substrate are coated with dielectric films and a conductive layer.

If both faces of the substrate 20 are coated with dielectric multilayer films 30, it is desirable to coat the top surface of the layers 30 on each side with a conductive layer 40 as illustrated in FIG. 3.

Figure 2:
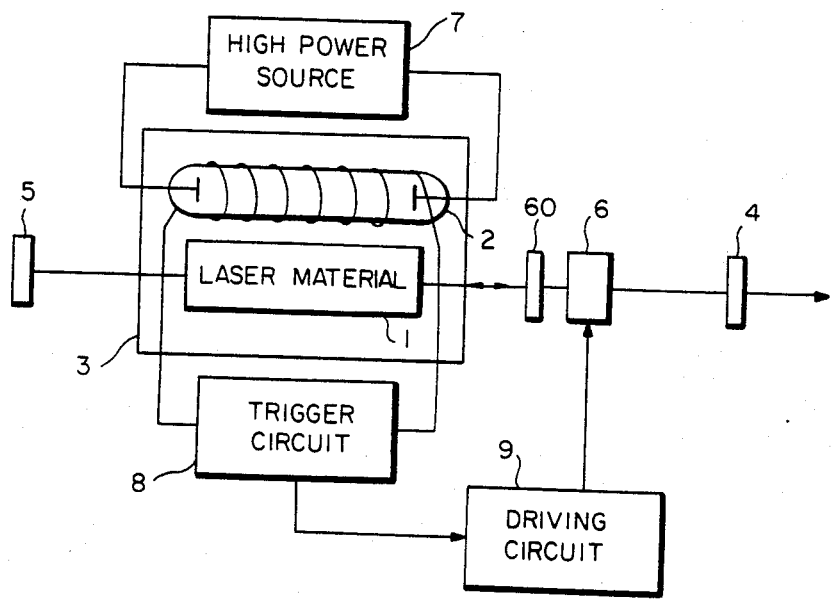
FIG. 2 is a block diagram showing a schematic view of a preferred embodiment of the laser system according to the invention.

FIG. 2 illustrates a Q-switched solid state laser system using a reflector which has a conductive film formed over the top surface of dielectric multilayer films.

In the figure, a solid state laser material 1, consisting of YAG crystal rods, is optically-pumped by a flash lamp 2. The laser material 1 and the flash lamp 2 are housed in a cavity 3, which is so shaped as to enable a light beam from the flash lamp 2 to be efficiently focused on the laser material 1. The electrodes of the flash lamp 2 are connected to a high power source 7 to be applied with a high D.C. voltage, and a thin wire is wound round the lamp over its full length. A trigger voltage supplied from a trigger circuit 8 to this wire causes the flash lamp 2 to emit light.

On the axis of the laser beam are arranged reflectors 4 and 5 constituting resonators, a Pockels cell 6 and a polarizing element 60, and the laser beam is outputted from the reflector 4. A driving circuit 9, driving the Pockels cell 6, generates repetitive two-level pulse signals. When the signal level is zero, the loss of the Pockels cell 6 with respect to a light beam polarized by the polarizing element 60 in a specific direction is virtually eliminated, and giant pulses are generated from the laser material which has been pumped so far. The reflectors used in this laser system are multilayer reflectors having conductive films of the kind described earlier, and the reflector 5 is a totally reflective mirror.

In this laser system, the optical energy over the surfaces of the reflectors 4 and 5 is greater in an over two-digit order than that outside the resonators, but the presence of conductive films over the reflector surfaces prevents the reflectivity of the reflectors from being deteriorated by aging, and thereby makes it possible to provide a stable laser output.

Although a Pockels cell is used as Q-switching element in the circuitry of FIG. 2, a Kerr cell or a Faraday cell may be substituted therefor.

What is claimed is:

1. A dielectric multilayer reflector for reflecting a laser beam at a prescribed reflectivity comprising a transparent substrate, dielectric layers formed over a surface of said transparent substrate and a conductive layer formed over a top surface of said dielectric layers wherein said conductive layer is of a thickness such that it does not adversely affect the reflectivity and transmissivity of the reflector.

2. A dielectric multilayer reflector, as claimed in claim 1, wherein said conductive layer is provided with grounding means.

3. The reflector of claim 1, wherein said dielectric layers comprise high refractive index layers and low refractive index layers vapor-deposited one over another.

4. The reflector of claim 1, wherein an uppermost dielectric layer and a lowermost dielectric layer comprise high refractive index layers.

5. The reflector of claim 1, wherein additional dielectric layers with an additional conductive layer formed over the top surface of said additional dielectric layers are formed over an additional surface of said substrate.

6. A laser system comprising a laser material, means for exciting said laser material and reflectors arranged at a first and second end, respectively, of said laser material and constituting laser resonators, wherein each of said reflectors has a transparent substrate, dielectric layers formed over a surface of said transparent substrate and a conductive layer formed over a top surface of said dielectric layers, said reflectors oriented to initially receive laser light incident on said conductive layer.

7. A laser system, as claimed in claim 6, wherein said conductive layer of each of said reflectors is provided with grounding means.

8. The laser system of claim 6, wherein said dielectric layers comprise high refractive index layers and low refractive index layers vapor-deposited one over another.

9. The laser system of claim 6, wherein the uppermost dielectric layer and the lowermost dielectric layer are high refractive index layers.

10. The laser system of claim 6, wherein said conductive layer is of a thickness such that it does not adversely effect the reflectivity and transmissivity of the reflector.

11. The laser system of claim 6, wherein the conductive layer has a thickness not greater than ¼ of the wavelength of a laser beam generated by a said laser system.

12. The laser system of claim 6, wherein additional dielectric layers with an additional conductive layer formed over the top surface of said additional dielectric layers are formed over an additional surface of said substrate.

13. The laser system of claim 6, further comprising a Q-switching means and a polarizing element, said Q-switching means and said polarizing element being interposed between one of said reflectors and said laser material.

14. A method of preventing electric charge accumulation on a laser mirror comprising the steps of:
(a) depositing a plurality of dielectric films over a reflector substrate;
(b) forming a conductive layer on top of said plurality of dielectric films, said conductive layer having a thickness wherein said conductor layer does not adversely effect the reflectivity and transmissivity of the reflector.

15. The method of claim 14, further comprising the step of grounding said conductive layer.

16. The method of claim 14, wherein the step of forming a conductive layer comprises vapor depositing said conductive layer onto said dielectric film.

17. A method of preventing electric charge accumulation on a laser mirror comprising the steps of:
(a) depositing a plurality of dielectric films over a reflector substrate;
(b) forming a conductive layer on top of said plurality of dielectric films, said conductive layer having a thickness not greater than 1/4 of the wavelength of a laser beam impinging on said mirror.

18. The method of claim 17 further comprising the step of grounding said conductive layer.

19. A dielectric multilayer reflector for reflecting a laser beam at a prescribed reflectivity comprising a transparent substrate, dielectric layers formed over a surface of said transparent substrate and a conductive layer formed over a top surface of said dielectric layers, wherein additional dielectric layers with an additional conductive layer formed over the top surface of said additional dielectric layers are formed over an additional surface of said substrate.

20. A laser system comprising a laser material, means for exciting said laser material and reflectors arranged at a first and second end, respectively, of said laser material and constituting laser resonators, wherein
each of said reflectors has a transparent substrate, dielectric layers formed over a surface of said transparent substrate and a conductive layer formed over a top surface of said dielectric layers, wherein additional dielectric layers with an additional conductive layer formed over the top surface of said additional dielectric layers are formed over an additional surface of said substrate.

21. A dielectric multilayer reflector for reflecting a laser beam at a prescribed reflectivity comprising a transparent substrate, dielectric layers formed over a surface of said transparent substrate, and a conductive layer formed over a top surface of said dielectric layers wherein said conductive layer has a thickness not greater than ¼ of the wavelength of the laser beam.

* * * * *